United States Patent [19]

Kurashina et al.

[11] Patent Number: 5,059,232
[45] Date of Patent: Oct. 22, 1991

[54] METHOD OF MANUFACTURING GLASS BY USING A FLOAT BATH

[75] Inventors: Isao Kurashina; Takeshi Horiguchi, both of Osaka, Japan

[73] Assignee: Nippon Sheet Glass Co., Ltd., Osaka, Japan

[21] Appl. No.: 543,123

[22] Filed: Jun. 25, 1990

[30] Foreign Application Priority Data

Jul. 4, 1989 [JP] Japan .................................. 1-172555

[51] Int. Cl.⁵ .............................................. C03B 18/02
[52] U.S. Cl. ...................................... 65/99.2; 65/99.4; 65/182.3
[58] Field of Search ................ 65/24, 99.2, 99.3, 99.4, 65/182.3, 182.5, 90

[56] References Cited

U.S. PATENT DOCUMENTS 3,494,755 2/1970 Montgomery ........................... 65/27
3,524,739 8/1970 Loukes ................................. 65/99.2

Primary Examiner—Kenneth M. Schor
Assistant Examiner—John Hoffmann
Attorney, Agent, or Firm—Kanesaka and Takeuchi

[57] ABSTRACT

In a glass manufacturing method by means of a float bath for manufacturing a sheet glass by floating a glass ribbon on molten metal, a plate made of heat resistant and highly heat conductive carbon fiber carbon composite material is disposed between the floated glass ribbon and the ceiling portion of the float bath, so that obstacles can be prevented from dropping on the glass ribbon.

4 Claims, 3 Drawing Sheets

METHOD OF MANUFACTURING GLASS BY USING A FLOAT BATH

Field of the Invention and Related Art Statement

The present invention concerns a method of manufacturing glass by using a float bath and a glass manufacturing device. More in particular, it relates to a glass manufacturing method by using a float bath capable of preventing obstacles such as tin compounds from dropping on a molten float glass (ribbon) on molten tin (metal), and a glass manufacturing device.

A glass manufacturing method based on a floating process for producing a sheet glass while floating a glass ribbon on a molten metal tin has been practiced generally. In the glass manufacturing method by using the float process, volatilization of metal tin itself causes no substantial problem because it has a low vapor pressure. However, if oxygen or sulfur is present in the float bath, metal tin sublimates as SnO or SnS at a temperature higher than 850° C. Vapor pressures of SnO and SnS are 10 times and 100 times higher than that of tin respectively (at 1,000° C.). Oxygen is supplied due to leakage of atmospheric air caused by incomplete sealing or supplied from the glass ribbon per se, and sulfur is supplied from glass per se.

The thus sublimated SnO or SnS condenses or deposits to relatively low temperature portions such as a cooler or a float bath to form ceiling deposition products.

SnO or SnS in the ceiling deposition products are reduced with $H_2$ into metal tin which drops on the ribbon to cause defects. SnO, SnS per se may also drop depending on the case.

For preventing occurrence of the defects caused by the dropping of the ceiling deposition products, the following counter measures are taken:

(1) Sealing ability of the float bath is improved to prevent intrusion of oxygen.

(2) Atmosphere in the float bath is withdrawn from a portion at a temperature higher than 850° C. in which sublimation of SnO, SnS occurs, to thereby lower the concentration of the sublimation products in the bath.

(3) Ceiling deposition products are scraped off periodically by means of cleaning for a cooler or blowing off.

Further, operation is conducted at high temperature while increasing a hydrogen concentration thereby temporarily increasing the amount of the ceiling deposition products dropped and, thereafter, operation is continued while returning the conditions in the bath to a normal state.

Among the countermeasures described above, the method (1) is usually conducted. Further, the countermeasures (2) and (3) are applied just before the production of high quality products in which the operation is conducted in a growing region of the ceiling deposition products during preparation of higher quality products.

If the sealing ability of the float bath is improved as in (1) described above, although the intrusion of oxygen into the bath can be prevented, supply of oxygen or sulfur from the ribbon itself can not be prevented. Accordingly, dropping of the ceiling deposition products can not completely be prevented.

Since the countermeasures (2) and (3) are the operation for dropping the ceiling deposition products (blowing off, high temperature operation, etc.), glass plates are not manufactured in lower or higher grade products during or just after the blowing, and the operation efficiency of the manufacturing device is lowered remarkably along with the dropping operation for the ceiling deposition products. Further, it is impossible to completely drop the ceiling deposition products over a wide float bath ceiling surface and the ceiling products are made rather instable by the blowing operation to increase the defects.

As described above, conventional countermeasures can not surely prevent the occurrence of defects caused by the dropping of the ceiling deposition products on the glass ribbon.

OBJECT AND SUMMARY OF THE INVENTION

An object of the present invention is to provide a float bath and a glass manufacturing method using it capable of reliably preventing ceiling deposition products from dropping onto a glass ribbon and reliably preventing the occurrence of defects, without changing the operation conditions.

Another object of the present invention is to improve the working efficiency of a float bath.

In the present invention, a plate made of heat resistant and highly heat conductive material is disposed between a glass ribbon floated on a molten metal in a float bath and a ceiling portion in the float bath, so that obstacles or ceiling deposition product can be prevented from dropping on the glass ribbon.

In the present invention, carbon composite material is extremely suitable for the plate. Sintered SiC plate may also be used although it is not considered optimum.

In the method according to the present invention, ceiling deposition products, if dropped, are received on the plate and not dropped on the glass ribbon. Accordingly, occurrence of defects to the ribbon can surely be prevented.

DESCRIPTION OF THE PREFERRED EMBODIMENTS

Figure 1:
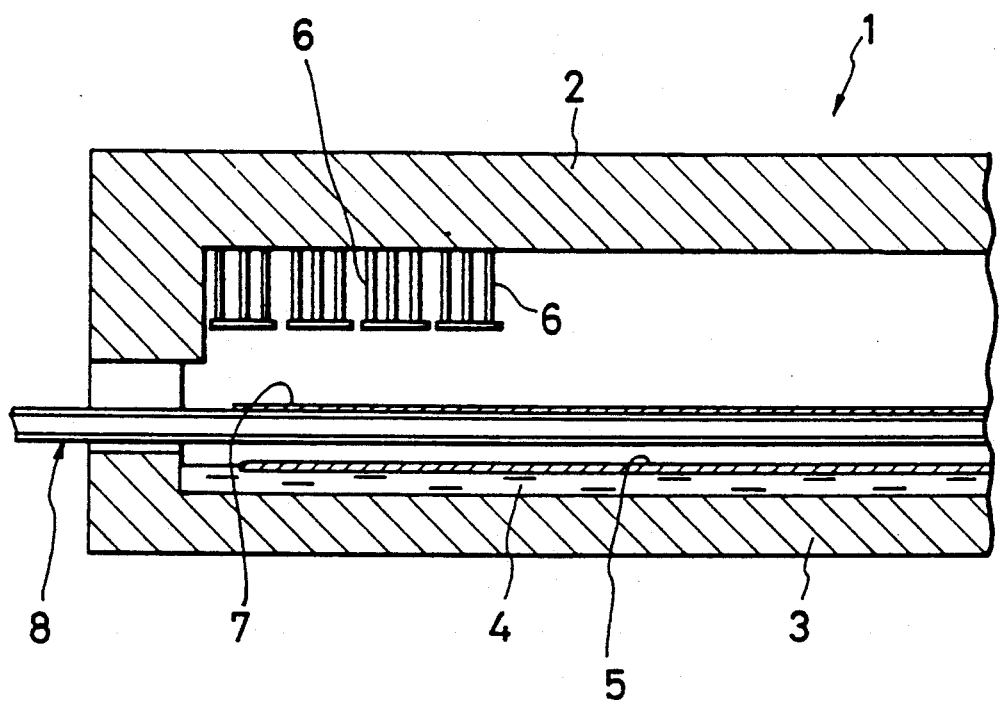
FIG. 1 is a longitudinal cross sectional view for a portion of a float bath suitable to practicing the method according to the present invention.

In the present invention, it is required that the plate described above has properties as shown below.

(1) The plate is highly heat conductive and the glass ribbon can be heated and cooled by way of the plate. Further, the lower surface of the plate is heated by the irradiation heat from the ribbon and the temperature in the bath can be maintained to a temperature about equal to that in a case of not using the plate, and abnormal growth of the ceiling deposition products can be prevented.

(2) It is necessary that the plate is exchanged and cleaned easily and, at the same time, it is not easily damaged even when an operation tool collides against it. For this purpose, it is required that the plate has a high strength and Young's modulus at a temperature range of 600° to 1500° C.

(3) It is also required that the plate has thermal impact shock resistance.

(4) It is further required that the plate is reduced in the weight and easy to fabricate.

As the material capable of satisfying such required properties, carbon fiber carbon composite material is extremely suitable.

The properties of the carbon fiber carbon composite material are shown below.

| Property of the plate made of carbon fiber carbon composite material | |
| --- | --- |
| Apparent specific gravity | 1.3–1.6 g/cc |
| Bending strength | 7.0–20.0 kg/mm$^2$ |
| Bending modulus | 1.5–6.0 × 10$^3$ kg/mm$^2$ |
| Tensile strength | 4.0–16.0 kg/mm$^2$ |
| Compression strength | 13.0 kg/mm$^2$ |
| Shore hardness | 45–95 |
| Heat expansion coefficient | |
| in parallel with fibers | 0.3–0.6 × 10$^{-6}$/°C. |
| in perpendicular to fibers | 4.0–4.4 × 10$^{-6}$/°C. |
| Heat conductivity | |
| in parallel with fiber | 5.5 Kcal/mhr °C. |
| in perpendicular to fiber | 0.5 Kcal/mhr °C. |
| Specific heat | 0.2 cal/g °C. |

The embodiment of the present invention will be explained referring to the drawings.

FIG. 1 is a cross sectional view illustrating a float bath suitable to practicing the method according to the embodiment of the present invention, which shows a longitudinal cross sectional view of the float bath at the lateral end.

In FIG. 1, reference numeral 1 denotes a float bath, in which a ceiling portion is made of a roof refractory material 2 and the bottom is made of bottom refractory material 3. A bath of molten tin 4 is formed on the refractory material 3 and a glass ribbon 5 is floated on the molten tin 4. A heating element 6 is attached to the roof reftactory material 2.

Above the glass ribbon 5, there is disposed a plate 7 made of carbon fiber carbon composite material. In this embodiment, the plate 7 is disposed on a support 8. The support suitably comprises a beam or pipe made of carbon fiber carbon composite material, which may be an air or water-cooled tube. Further, although the plate 7 is disposed on the support 8, it may be attached so as to be suspended from the support 8 by means of bolts, etc.

It is preferred that the plate 7 covers such that the width thereof is substantially equal be that of the glass ribbon in view of the lateral direction of the bath, while the plate 7 entirely covers a required range in view of the forwarding direction of the glass ribbon.

Figure 2:
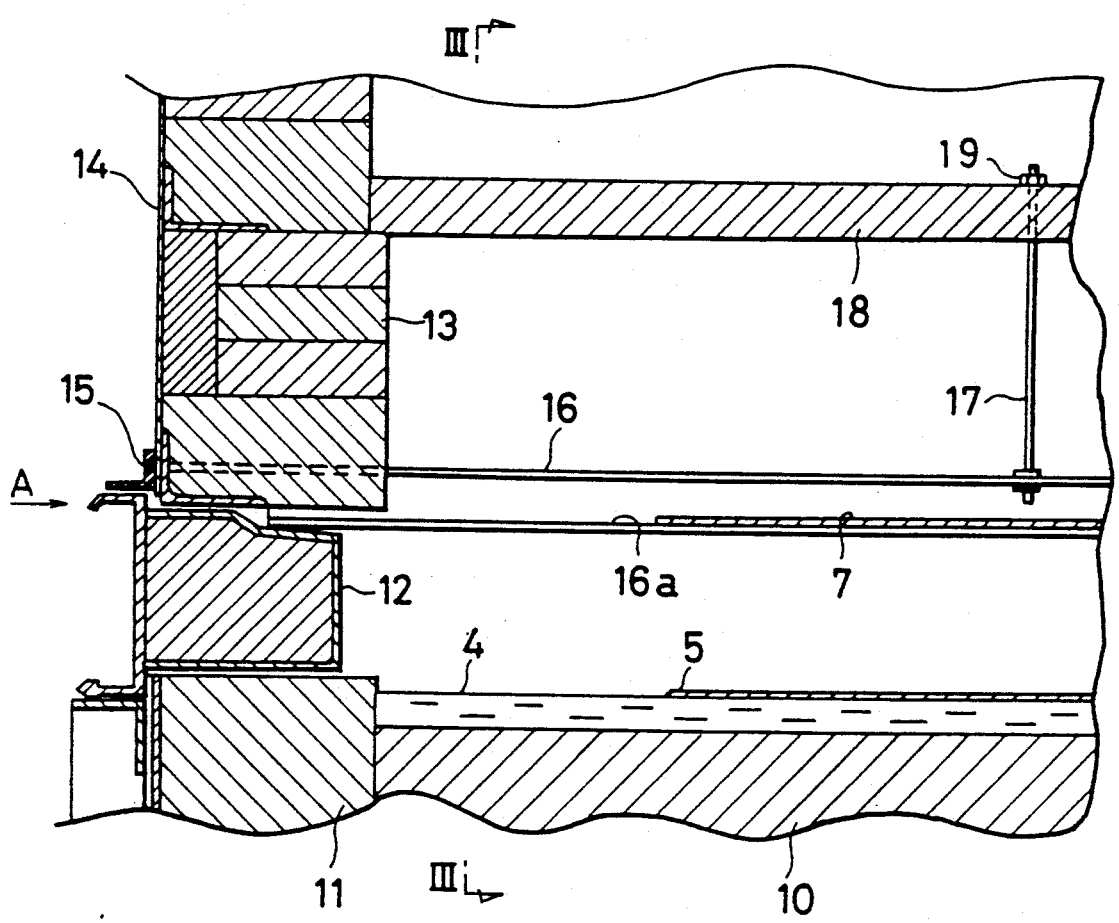
FIG. 2 is a longitudinal cross sectional view for a portion illustrating another embodiment and FIG. 3 is a cross sectional view taken along line III—III in FIG. 2.

FIG. 2 is a cross sectional view illustrating a structure of one embodiment, in which a plate attaching device is incorporated into a float bath main body and it illustrates a longitudinal cross section in the lateral end of the float bath. Further, FIG. 3 is a cross sectional view taken along line III—III in FIG. 2.

Figure 3:
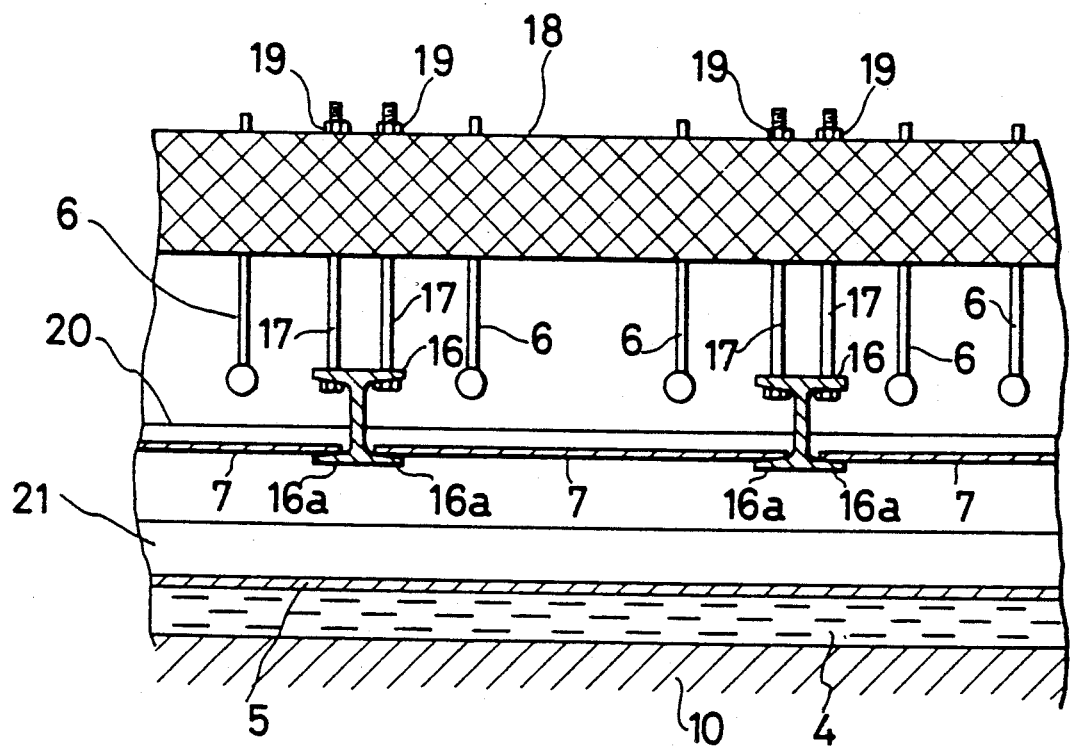

In FIGS. 2 and 3, there are shown a bottom block 10, a side block 11, a side sealing 12, a roof side lintel 13, a side plate 14 and a side seal angle 15. Molten tin 4 is stored in a portion surrounded by the bottom block 10 and the side block 11, over which the glass ribbon 5 is floated.

Above the glass ribbon 5, beams 16 made of carbon fiber carbon composite material are arranged in the horizontal direction. The beam 16 is an I beam having an I-shaped vertical cross section and the plates 7 made of carbon fiber carbon composite material are disposed such that they are engaged on the lower flange portions 16a of the I-beams 16. 17 denotes a hanger made of carbon fiber carbon composite material for supporting the beam 16. The hanger 17 penetrates the roof refractory 18 and a nut 19 made of carbon fiber carbon composite material is screw-coupled to the upper end thereof.

FIG. 3 also shows the lower surface 20 of the roof side wall and the lower surface 21 of the bath side wall.

In the float bath having the plate 7 disposed as described above, the operation is conducted by the method known per se in the same manner as in the conventional float bath. In this case, the ceiling deposition products can surely be prevented from dropping on the glass ribbon 5 even without using the countermeasure for preventing the dropping of the ceiling deposition products as shown in the prior art described above. That is, even when the ceiling deposition products are dropped, they are received by the plate 7 and do not drop on the glass ribbon.

What is claimed is:

1. A method of manufacturing a sheet glass by floating a glass ribbon on a molten metal, comprising, providing a float bath having a glass ribbon floated on a molten metal, disposing a plate having resistance against high temperature and good heat conductivity, between said floated glass ribbon and a ceiling portion of said float bath, said plate being made of a carbon fiber carbon composite material and said plate having the following properties:

| apparent specific gravity | 1.3–1.6 g/cc |
| --- | --- |
| bending strength | 7.0–20.0 kg/mm$^2$ |
| bending modulus | 1.5–6.0 × 10$^3$ kg/mm$^2$ |
| tensile strength | 4.0–16.0 kg/mm$^2$ |
| shore hardness | 45–95 |
| heat expansion coefficient | |
| parallel with fibers | 0.3–0.6 × 10$^{-6}$/°C. |
| perpendicular to fibers | 4.0–4.4 × 10$^{-6}$/°C. and | forming a glass sheet in the float bath, with ceiling deposition products, which have been formed by products of said molten metal being deposited on the ceiling portion of the float bath, being prevented from dropping onto the glass ribbon by the plate, while forming the glass sheet.

2. A method as defined in claim 1, wherein said plate further has the following properties:

| heat conductivity: | |
| --- | --- |
| parallel to fiber | 5.5 kcal/mhr °C. |
| perpendicular to fiber | 0.5 kcal/mhr °C. |
| specific heat | 0.2 cal/g °C. |
| compression strength | 13.0 kg/mm$^2$. |

3. A method as defined in claim 1, wherein the molten metal is molten tin.

4. A method as defined in claim 1, wherein a width of the plate in a specific direction perpendicular to a floating direction of the glass ribbon is substantially identical to a width of the glass ribbon in the same said specific direction.

* * * * *